(12) United States Patent
Balpe (10) Patent No.: US 8,743,573 B2
(45) Date of Patent: Jun. 3, 2014

(54) VOLTAGE INVERTER AND METHOD OF CONTROLLING SUCH AN INVERTER

(75) Inventor: Cédric Balpe, Colombes (FR)

(73) Assignee: Hispano Suiza, Colombes Cedex (FR)

( * ) Notice: Subject to any disclaimer, the term of this patent is extended or adjusted under 35 U.S.C. 154(b) by 0 days.

(21) Appl. No.: 13/703,764

(22) PCT Filed: May 25, 2011

(86) PCT No.: PCT/FR2011/051177
§ 371 (c)(1),
(2), (4) Date: Dec. 12, 2012

(87) PCT Pub. No.: WO2011/157916
PCT Pub. Date: Dec. 22, 2011

(65) Prior Publication Data
US 2013/0094266 A1    Apr. 18, 2013

(30) Foreign Application Priority Data

Jun. 14, 2010 (FR) ...................................... 10 54690

(51) Int. Cl.
*H02H 7/122* (2006.01)
*H02M 7/493* (2007.01)

(52) U.S. Cl.
USPC ............................. 363/56.02; 363/71; 363/132

(58) Field of Classification Search
USPC ............ 363/55, 56.02, 56.03, 56.04, 98, 132, 363/71
See application file for complete search history.

(56) References Cited

U.S. PATENT DOCUMENTS

| 7,558,092 | B2 * | 7/2009 | Nakahori | 363/71 |
| 7,612,509 | B2 * | 11/2009 | Urakabe et al. | 318/378 |
| 8,026,691 | B2 * | 9/2011 | Nagashima et al. | 318/801 |
| 8,374,011 | B2 * | 2/2013 | Wirth | 363/131 |
| 2002/0048181 | A1 * | 4/2002 | Kobayashi et al. | 363/71 |

FOREIGN PATENT DOCUMENTS

| FR | 2 892 243 | 4/2007 |
| WO | WO 2008/087270 A2 | 7/2008 |
| WO | WO 2010/034906 A2 | 4/2010 |

OTHER PUBLICATIONS

International Search Report as issued for PCT/FR2011/051177, 2010.

* cited by examiner

*Primary Examiner* — Gary L Laxton
(74) *Attorney, Agent, or Firm* — Pillsbury Winthrop Shaw Pittman LLP (57) ABSTRACT

A voltage inverter capable of operating in the event of a short-circuit or open-circuit fault. The voltage inverter includes: a load having three phases, each phase having a first terminal and a second terminal; first and second cells each including three branches connected together in parallel, each branch including two switches connected in series and a mid-point positioned between the two switches, each first terminal of each of the phases being connected to one of the mid-points of the first cell and each second terminal of each of the phases being connected to one of the mid-points of the second cell; and a DC voltage source, the first and second cells each being connected to the DC voltage source via two electrical isolators.

9 Claims, 4 Drawing Sheets

VOLTAGE INVERTER AND METHOD OF CONTROLLING SUCH AN INVERTER

CROSS-REFERENCE TO RELATED APPLICATIONS

This is the U.S. National Stage of PCT/FR2011/051177, filed May 25, 2011, which in turn claims priority to French Patent Application No. 1054690, filed Jun. 14, 2010, the entire contents of all applications are incorporated herein by reference in their entireties.

TECHNICAL AREA OF THE INVENTION

The present invention relates to a voltage inverter that is resilient to faults. Such an inverter is designed to enable a DC voltage to be converted into one or more AC voltages with reversible power. The present invention also relates to a method for controlling such an inverter.

REVIEW OF THE PRIOR ART

Many inverters are used to convert a DC voltage into one or more AC voltages, particularly in the field of aeronautics.

Such an inverter is generally connected to the terminals of a DC voltage source and it transforms the DC voltage into AC voltage to supply a three-phase AC load. This AC load may be a three-phase alternating current machine such as a permanent magnet synchronous motor. Such a voltage inverter generally comprises three branches, each of which has two electrical switching means connected to the DC voltage source. For each of the three branches, the mid-point of the switching means is connected to a phase of the three-phase AC load. The switching means generally consist of a static switch and a diode in antiparallel.

Particularly in the field of aeronautics, safety and reliability are paramount. This is why such an inverter must be capable of continuing to function despite the occurrence of one or more internal faults.

Therefore, several configurations that enable to inverter to continue functioning despite the occurrence of one or more faults are already known in the prior art. For example, the document FR2892243, describes an inverter that is able to continue functioning despite the existence of faults and which also comprises a fourth branch connected to the voltage source. This fourth branch features two switching means connected in series and a mid-point. The mid-point of this fourth arm is connected to the neutral of the load. When the inverter is operating normally, the fourth branch is inactive. But if a malfunction occurs in one of the other three branches, the fourth branch is activated and enables the potential of the neutral of the load to be controlled in such manner that the load may be diverted to the two functioning branches via the neutral load point. Thus, in the case of a load from an electric rotary machine, the continuity of the rotating field and therewith the production of torque may be assured.

The presence of this fourth branch enables then the functioning of the inverter if one of the three branches fails. However, according to the solution described in that document, if a fault occurs on one of the branches, the load then only functions on two phases, resulting in a loss of power to the permanent magnet synchronous motor, leading to a loss of torque, or instead requiring that the motor be overpowered beforehand.

SUMMARY OF THE INVENTION

The object of the invention is to address the drawbacks associated with the prior art by providing an inverter that is able to continue functioning despite the occurrence of internal faults.

A further object of the invention is to provide an inverter that does not cause a loss of motor torque even in the event of an internal fault.

A further object of the invention is to provide an inverter with high availability and lower installed space requirement.

A further object of the invention is to suggest a voltage inverter that is able to function at low speed without concern for overcurrent issues.

To do this, according to a first aspect of the invention a voltage inverter is provided comprising:
   a load having n phases, each phase having a first terminal and a second terminal;
   a first and a second cell each comprise n branches, each branch comprising:
      two switching means connected in series, each switching means being capable of being placed in a passing state or a blocking state,
      a mid-point located between the two switching means,
   each first terminal of each of the load phases being connected to one of the mid-point of the first cell, each second terminal of each of the load phases being connected to one of the mid-points of the second cell,
   a voltage source,
   the first and the second cells each being connected to the voltage source via two electrical isolation means that are capable of being placed in a passing state or a blocking state.

The inverter according to the invention is particularly notable because it does not have a permanent neutral. In fact, unlike the inverters of the prior art, the various load phases are not connected to a permanent neutral point, but to two cells, the first and second cells, which are identical.

The n branches that belong to the same cell are preferably configured in parallel.

The inverter according to the invention has two possible normal operating modes:
   According to a first operating mode, each load phase creates an H bridge together with the two branches to which it is connected. In this case, the inverter according to the invention operates without a neutral;
   According to a second operating mode, one of the two cells of the inverter is isolated from the voltage source and the switching means thereof are such that this cell forms a neutral point to which the n load phases are connected.

If a fault occurs in one of the cells of the inverter, this faulty cell is converted into a neutral point by the switching means of said cell, and this neutral point is isolated from the voltage source by the electrical isolating means that are associated with this cell. Thus, when a cell is faulty, that cell is converted into a neutral point to which the n load phases are connected. The n load phases may then continue to function normally via the cell that is not faulty. The installation according to the invention thus enables all of the phases to be used in the event that one of the branches fails, which in turn enables the loss of power associated with a fault in one of the branches of the inverter to be avoided. Thus, in the case of an electric rotary machine type load, the continuity of the rotating field and therewith the production of torque is assured.

If an open circuit fault occurs in one of the load phases, the switching means of the two branches that are connected to the faulty phase are opened so that the open circuit phase is disconnected from the voltage source. Then, the inverter according to the invention operates only with the n−1 load phases that are not faulty.

The inverter according to the invention is particularly advantageous because only four electrical isolation means are used regardless of the number of load phases.

In addition, the inverter according to the invention only uses a single voltage source, thus enabling a saving in the number of components used.

The invention most particularly relates to a case in which n is equal to 3.

The load is preferably a three-phase AC load, and yet more preferably a permanent magnet synchronous motor.

The voltage source is preferably a DC voltage source. This voltage source is traditionally obtained by rectification from the aircraft's onboard electrical network; the voltage may also be derived directly from a DC voltage network.

Each switching means advantageously comprises a static switch and a diode in antiparallel.

The static switch of each switching means is advantageously a transistor or a thyristor.

Each electrical isolation means is advantageously a bidirectional switch.

According to an especially preferred embodiment, the inverter according to the invention also comprises a device for controlling and monitoring faults, suitable for:
  controlling the electrical isolation and switching means,
  detecting a malfunction in one of the switching means, and
  detecting a malfunction in the connection between the terminals of one of the phases and one of the mid-points.
  According to various embodiments:
  the control and monitoring device may be constituted by several elementary control and monitoring units, each elementary control and monitoring unit being subordinate to a switching means or an electrical isolation means;
  the control and monitoring device may be constituted by one single elementary control and monitoring unit, which is subordinate to all of the switching means and all of the electrical isolation means.

The control and monitoring device is advantageously suitable for controlling the states of the switching means and of the electrical isolating means.

According to a preferred embodiment, each mid-point is also connected to a neutral point via a switching element, which switching element may be placed in a blocking start or a passing state.

These connections of the mid-points to a neutral point are particularly advantageous in the event of a partial short-circuit in one of the switching means. In fact, in the event of a short-circuit in one of the switching means, this short circuit is used to convert the cell to which the switching means belong into a short circuit in neutral point. But if the short-circuit is not complete, it can create a load imbalance. To address this problem, the mid-points are all connected to a neutral point via switching elements. During normal operation, all the switching elements are in the blocking state, so that the mid-points are not electrically connected to the neutral. On the other hand, if a short circuit occurs in one of the switching means, the mid-point of the branch to which it belongs is automatically connected to the neutral, by placing the switching element to which it is connected into a passing state. In this way, the short circuit is forced, and the cell containing the switching means in which the short circuit has occurred still constitutes a perfect neutral point.

The control and monitoring device is advantageously also able to detect a fault in one of the switching elements.

The control and monitoring device is advantageously also able to control the switching element in such manner as to place them in a blocking state or a passing state.

The invention also relates to a method for controlling an inverter according to the invention, according to which, when no fault is detected the control method comprises the following steps:
  Placing the electrical isolation means connected to the first cell into a blocking state,
  Controlling the switching means of the first cell such that the first cell forms a neutral point to which the n load phases are connected,
  Placing the electrical isolation means connected to the second cell into a passing state;
  Controlling the switching means of the second cell such that the two switching means in the same branch of the second cell are in opposite states, one being passing and the other being blocking.

Thus according to the method, when no fault is detected, and therefore the inverter is in normal operation, one of the two cells, which will be referred to here as the first cell but might equally well be the second cell since the inverter according to the invention is completely symmetrical, is converted to the neutral point to which all of the load phases are connected. This neutral point is isolated from the voltage source by the electrical isolation means. The second cell, that is to say the cell that is not converted into the neutral point, continues to function like the cell of the prior art, that is to say that the switching means of each of these branches are placed alternatingly in opposite states. Thus, according to this embodiment, if no fault is present the inverter according to the invention functions in the same way as the inverters of the prior art, which comprised a single cell having three branches, the mid-point of each branch being connected to a load phase.

According to a further embodiment, the invention also relates to a method for controlling a voltage inverter according to the invention in which, when no fault is detected, the control method comprises the following steps:
  Placing all of the electrical isolation means into a passing state,
  Controlling the switching means such that each phase creates an H bridge with the two branches to which it is connected.

According to this further embodiment, the load functions without a neutral. In fact, each phase is connected to two mid-points, each mid-point belonging to one of the branches of one of the cells.

The term "H bridge" refers to an assembly, known to someone skilled in the art, in which the phase forms the crossbar in a capital letter H, and one branch of each cell forms the vertical legs of the H.

In this operating mode, the switching means are preferably actuated in pairs:
  the upper switching means of the branch of the first cell is in the same state as the lower switching means of the branch of the second cell;
  the lower switching means of the branch of the first cell is in the same state as the upper switching means of the branch of the second cell;
  the two switching means in each branch are in opposite states.

This H bridge embodiment enables better use of the available voltage range, and at equal power less current is used than with the control method according to the preceding embodiment.

The invention also relates to a method for controlling a voltage inverter in which, when a fault is detected in one of the switching means, the control method comprises the following steps:

Placing the electrical isolation means that are connected to the cell to which the faulty switching means belongs into a blocking state, Controlling the other switching means of the cell to which the faulty switching means belongs such that the cell to which the faulty switching means belongs forms a neutral point to which the n load phases are connected.

Thus, according to this method, in the event of a fault in one of the switching means, the other switching means of the cell to which the faulty switching means belongs are controlled such that the cell to which the faulty switching means belongs forms a neutral point to which all the load phases are connected. In this way, it is still possible to use all of the phases of the load even if one of the switching means is faulty.

The invention also relates to a method for controlling an inverter such that, when a malfunction is detected on the link between one of the terminals of one of the phases and one of the mid-points, the control method comprises the following step:

Placing the switching means that are connected to the phase that belongs to the faulty link into a blocking state.

In this manner, when one of the load phases is in open circuit the two branches to which it is connected are opened and it is then possible to continue using all of the other load phases.

The invention further relates to a method for controlling an inverter according to the invention such that when a short circuit fault is detected in one of the switching means, the switching element to which the short circuited switching means is connected is placed in the passing state.

The invention further relates to a method for controlling an inverter according to the invention such that when no short circuit fault is detected in the switching means, all of the switching elements are placed in the blocking state.

The control and monitoring device of the inverter according to the invention is advantageously capable of carrying out the steps of the control methods described in the preceding.

BRIEF DESCRIPTION OF THE DRAWING

Other features and advantages of the invention will be evident upon review of the following description, with reference to the accompanying drawing, in which.

For the sake of clarity, identical or similar elements are identified by the same reference signs in all of the figures.

DETAILED DESCRIPTION OF AN EMBODIMENT

Figure 1:
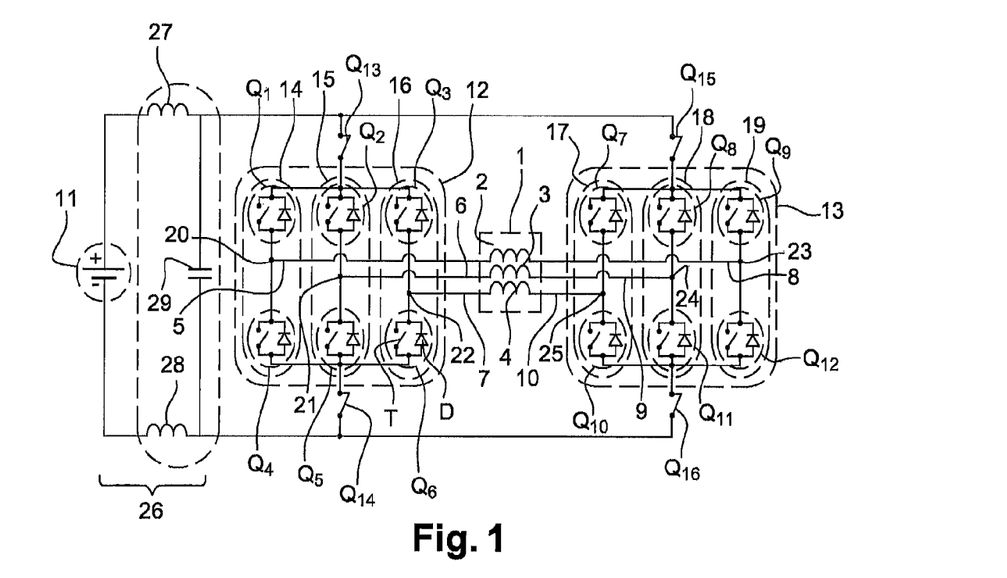
FIG. 1 is a schematic representation of a voltage inverter according to an embodiment of the invention.

FIG. 1 represents a voltage inverter according to an embodiment of the invention. This voltage inverter is a three-phase inverter designed to modulate the electrical energy that is exchanged between two sources of electrical energy, one of which being a source of DC voltage 11 and the other being an three-phase alternating load 1. Such an inverter may be bidirectional in power.

Load 1 consists of three phases, 2, 3 and 4 respectively. Load 1 is preferably a permanent magnet synchronous motor.

Each phase has a first terminal, 5, 6 and 7 respectively, and a second terminal 8, 9 and 10 respectively.

The voltage inverter also includes a first cell 12 and a second cell 13. Each cell 12, 13 has three branches, 14, 15, 16 and 17, 18, 19 respectively. The three branches of each cell are connected to each other in parallel.

Each branch comprises two switching means Q1/Q4, Q2/Q5, Q3/Q6, Q7/Q10, Q8/Q11, Q9/Q12. The two switching means on the same branch are connected in series. A mid-point 20, 21, 22, 23, 24, 25 is located between two switching means of the same branch.

Each switching means may be placed in a passing state or a blocking state.

Each switching means preferably consists of a static switch T and a diode D in antiparallel. The static switch is preferably a transistor, for example of the IGBT type (insulated-gate bipolar transistor) or a thyristor.

Each first terminal 5, 6, 7 of each phase is connected to one and only one of the mid-points of the first cell, 20, 21, 22 respectively.

Each second terminal 8, 9, 10 of each phase is connected to one and only one of the mid-points of the second cell, 23, 24, 25 respectively.

Each phase 2, 3, 4 thus forms an H bridge with one of the branches of the first cell and one of the branches of the second The first cell 12 is connected to the positive terminal of voltage source 11 via a first electrical isolating means Q13. The first cell 12 is connected to the negative terminal of voltage source 11 via a second electrical isolating means Q14.

The second cell 13 is connected to the positive terminal of voltage source 11 via a third electrical isolating means Q15. The second cell 13 is connected to the negative terminal of the voltage source via a fourth electrical isolating means Q16.

Each electrical isolating means may be placed in a passing or a blocking state.

Each electrical isolating means preferably consists of a switch that is bidirectional since the current is alternating current.

The inverter according to the invention may also include a filtering stage 26 located between voltage source 11 and the first and the second cells 12, 13.

This filtering stage 26 preferably includes two inductors 27, 28 in series with voltage source 11 and a capacitor 29 in parallel with voltage source 11.

The voltage inverter described in the preceding may function in two normal operating modes if no faults are present.

Figure 6:
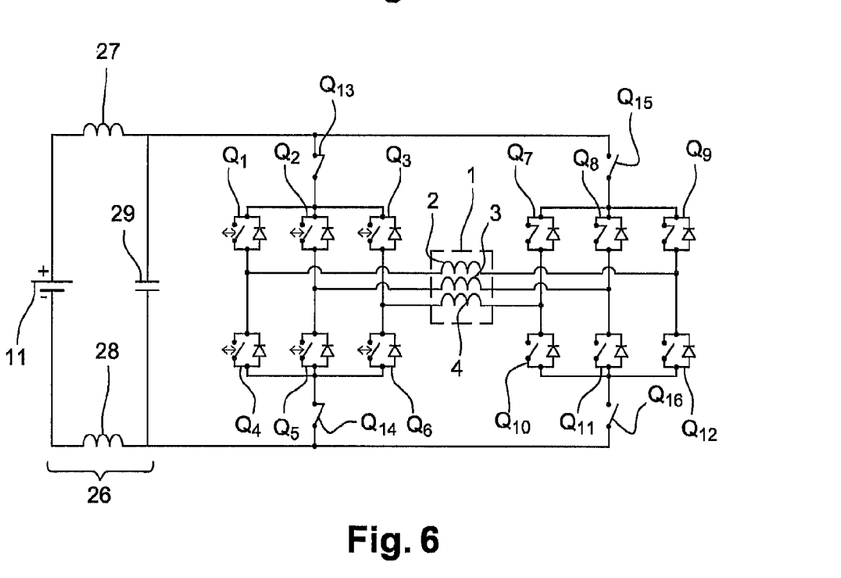
FIG. 6 is a schematic representation of the inverter of FIG. 1 according to a first normal operating mode.

According to the first normal operating mode, represented in FIG. 6, one of the cells, either the first cell or the second cell, creates a neutral point while the inverter functions with the other cell in the same way as the inverters of the prior art.

In the following text, we will assume that the neutral point is formed by second cell 13, but the same description would also be true if the neutral point were formed by the first cell, because both cells are perfectly identical.

In this case, the two electrical isolating means Q15 and Q16 that connect second cell 13 to voltage source 11 are placed in a blocking state such that second cell 13 is disconnected from voltage source 11. Moreover, switching means Q7 to Q12 of second cell 13 are in a state such that second cell 13 forms a neutral point to which the three load phases 2, 3, 4 are connected.

For this, the upper switching means Q7, Q8, Q9 are placed in a blocking state while the lower switching means Q10, Q11, Q12 placed in a passing state, or vice versa.

First cell 12 functions in the same way as the inverters of the prior art. Thus according to a preferred embodiment the switching means of the same branch are in opposite states, one in the blocking state and the other in the passing state.

Figure 7:
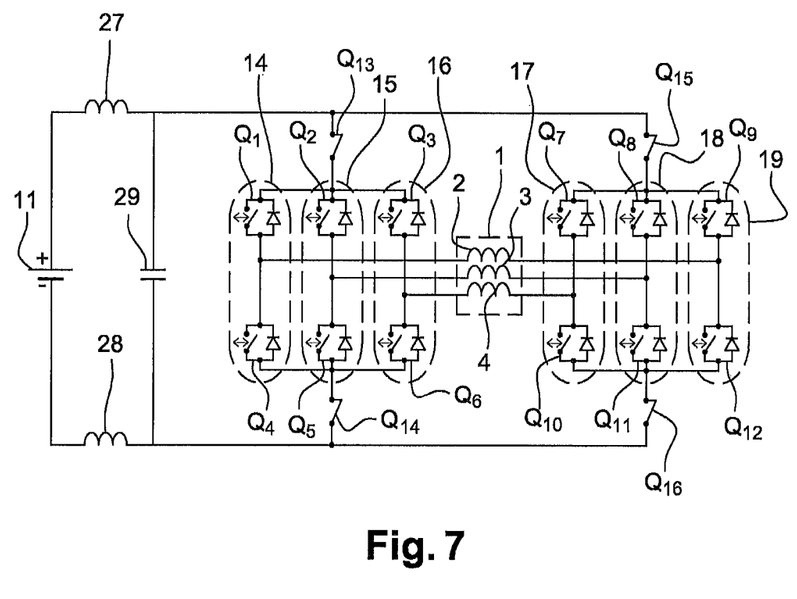
FIG. 7 is a schematic representation of the inverter of FIG. 1 according to a second normal operating mode.

According to the second normal operating mode, represented in FIG. 7, the voltage inverter functions without a neutral point. In this case, the four electrical isolating means Q13, Q14, Q15, Q16 are in a passing state.

Moreover, each phase cooperates with the two branches to which it is connected to form an H bridge in which the two switching means of the same branch are in opposite states, one being in the passing state while the other is in the blocking state.

Accordingly, phase 2 forms a first H bridge with branches 14 and 19. Phase 3 forms a second H bridge with branches 15 and 18. Phase 4 forms a third H bridge with branches 16 and 17.

In addition, when the upper switching means of a branch in the first cell is in a passing state, the lower switching means of the branch in the second cell belonging to the same H bridge is also in a passing state.

Accordingly, when switching means Q1 and Q12 are in a passing state, switching means Q4 and Q9 are in a blocking state and vice versa.

In the same way, when switching means Q2 and Q11 are in a passing state, switching means Q5 and Q8 are in a blocking state and vice versa.

In the same way, when switching means Q3 and Q10 are in a passing state, switching means Q6 and Q7 are in a blocking state and vice versa.

This normal operating mode without a neutral point is particularly advantageous because it enables the polarity of the voltage to be inverted at the terminals of each phase and the voltage inverter can then operate in a larger voltage range. Thus, according to this operating mode, the voltage range is twice as large as the range according to the first normal operating mode described in the preceding operating mode, that is to say the voltage range is equal to double the voltage range of voltage source 11.

Figure 2:
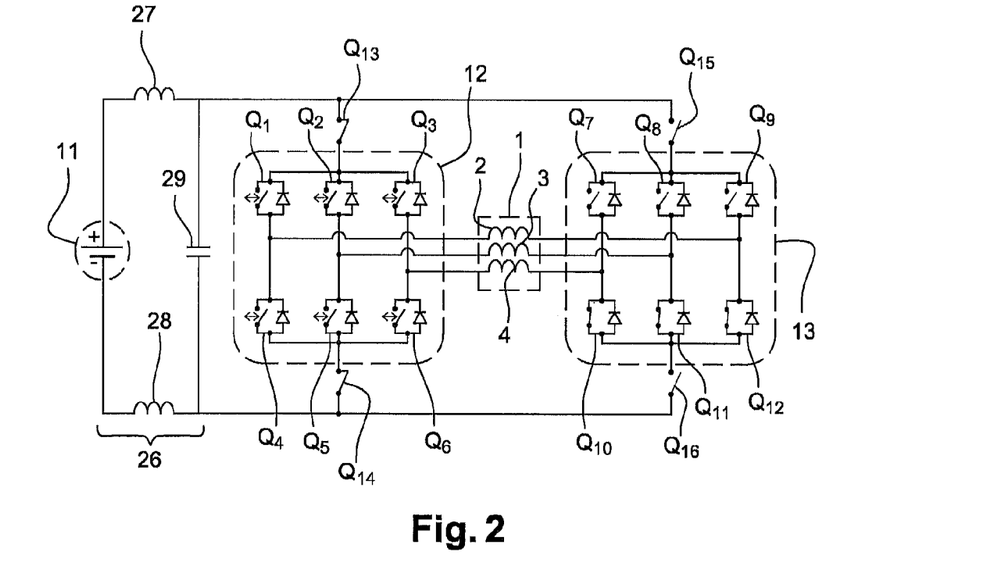
FIG. 2 is a schematic representation of the voltage inverter of FIG. 1 in which a short circuit has occurred in one of the switching means.

FIG. 2 shows the configuration of FIG. 1 in the event of a fault, and more particularly in the event of a short circuit in switching means Q10.

In this case, the other two switching means belonging to the same cell 13 as switching means Q10, in which the short circuit has occurred; and which are connected to switching means Q10 in short circuit, that is to say Q11 and Q12, are closed (or in a passing state).

The switching means belonging to the same cell 13 as switching means Q10, in which the short circuit has occurred, and which are opposite to the switching means in short circuit, that is to say Q7, Q8, Q9, are open (or in a blocking state).

Electrical insulating means Q15 and Q16 which connect cell 13 to which switching means Q10, in short circuit, belongs, are placed in a blocking state so that cell 13, to which the switching means Q10 belongs, is electrically isolated from voltage source 11.

In this way, cell 13, to which the faulty switching means belongs, forms a neutral point to which the three phases 2, 3, 4 of load 1 are connected. The inverter according to the invention may then continue to function using the three phase of the load, despite the existence of a short circuit in one of the cells, and there is therefore no loss of power despite the existence of a short circuit in one of the switching means.

In this case, the other cell, first cell 12 in this example, continues to function normally, that is to say the two switching means of the same branch are in opposite states to one another, one being in the blocking state and other being in the passing state.

Figure 3:
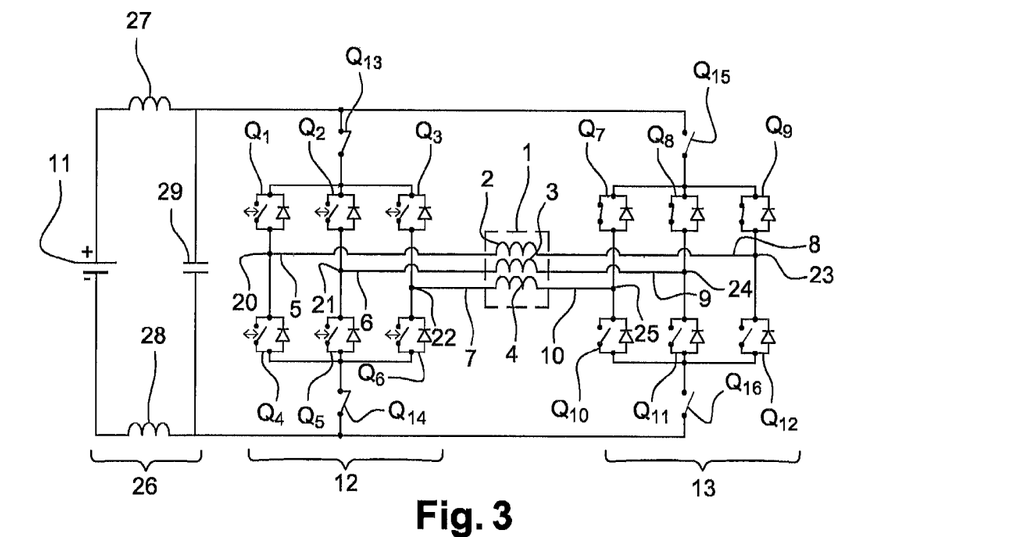
FIG. 3 is a schematic representation of the voltage inverter of FIG. 1 in which an open circuit has occurred in one of the switching means.

FIG. 3 shows the inverter of FIG. 1 in the event of an open circuit in one of the switching means, in this example switching means Q10.

In this case, the switching means that belong to the same cell 13 as switching means Q10, in which the open circuit has occurred, and which are connected to switching means Q10 in open circuit, that is to say Q11 and Q12, are placed into a passing state.

The switching means belonging to the same cell 13 as switching means Q10, in which the open circuit has occurred, and which are opposite to switching means Q10 in open circuit, that is to say Q7, Q8, Q9, are placed into a blocking state.

Electrical insulating means Q15 and Q16 that connect cell 13, to which belongs the switching means in open circuit, to voltage source 11, are placed in a blocking state so that cell 13 is disconnected from the voltage source.

This, as in the example of FIG. 2, the cell to which faulty switching means Q10 belongs is converted into a neutral point by using the faulty switching means.

The other cell 12 continues to function normally.

Figure 4:
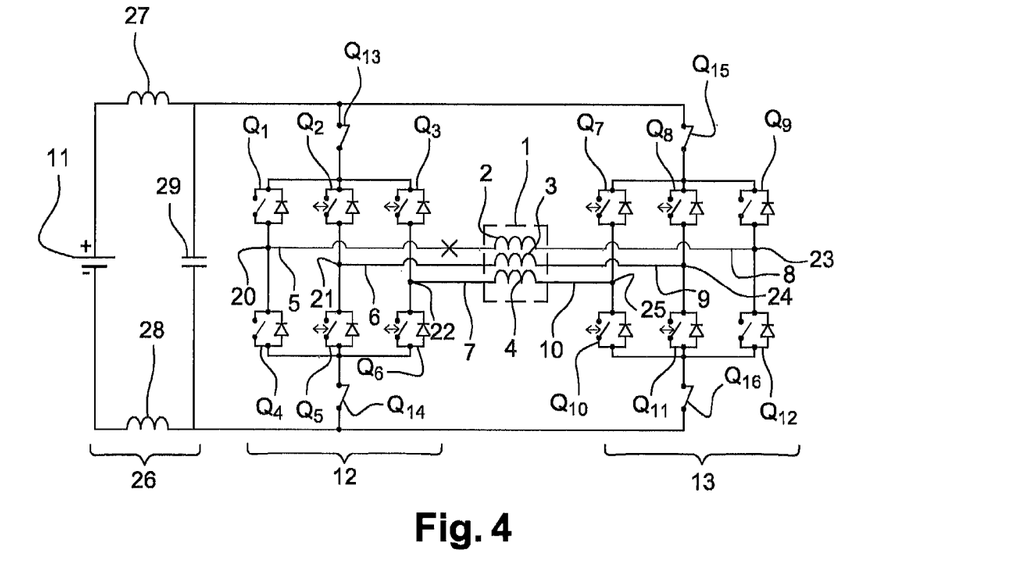
FIG. 4 is a schematic representation of the voltage inverter of FIG. 1 in which an open circuit fault has occurred in the link between one of the load phases and one of the branches of one of the cells of the inverter.

FIG. 4 shows the inverter of FIG. 1 in the event of an open circuit in one of the phases, the phase in that example being phase 2. More precisely, the link between terminal 5 of phase 2 of load 1 and mid-point 20 of branch 14 of the first cell is in open circuit.

In this case, all of the electrical switching means Q13, Q14, Q15, Q16 remain in a passing state.

Switching means Q1, Q4, Q9, Q12, which are connected to phase 2, which is in open circuit, are in a blocking state to isolate the faulty phase 2 from the rest of the circuit.

The faulty inverter then continues to operate with the other two phases 3 and 4, which are not faulty. Thus, these two phases are controlled by switching means Q2, Q3, Q5, Q6, Q7, Q8, Q10, Q11.

Figure 5:
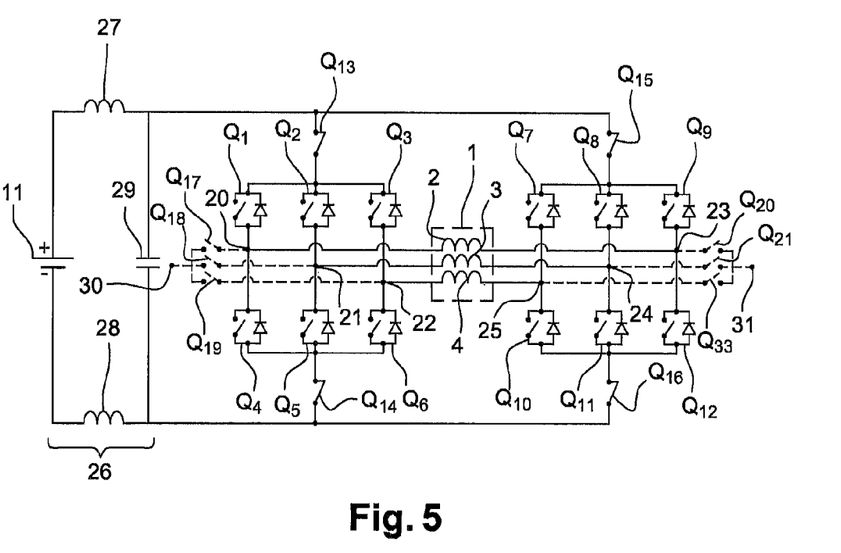
FIG. 5 is a schematic representation of a voltage inverter according to an embodiment of the invention.

FIG. 5 shows an inverter according to another embodiment of the invention. The inverter of FIG. 5 is identical to the one in FIG. 1 except that it also comprises six switching elements Q17 to Q22.

The first three switching elements Q17 to 019 connect the three mid-points 20, 21, 22 of first cell 12 to a first neutral point 30. The three switching elements Q20 to Q22 connect the three mid-points 23, 24, 25 of the second cell to a second neutral point 31.

Each switching element preferably consists of a switch mechanism.

When the inverter is operating normally, switching elements Q19 to Q22 are in a blocking state.

If a short circuit occurs in one of the switching means, for example Q10, switching element Q22, to which mid-point 25 of the branch to which Q10 belongs is connected, is placed in a passing state so that the branch to which Q1 belongs is placed in a state of perfect short circuit. In this way, even if the short circuit at Q10 were not perfect, cell 13, to which Q1 belongs, will be converted to a perfect neutral point.

The other switching elements Q20 and Q21, which connect the neutral points of cell 13 to which switching means Q10, in short circuit belongs, may also be placed in a passing state as soon as one the switching means of cell 13 is in short circuit.

If the fault is an open circuit type fault, the switching elements remain in the blocking state.

In the event of a short circuit fault in one of the phases of the load, in phase 2 for example, switching elements Q17 and Q20, which are connected to this phase, may be placed into a passing state.

Of course, the invention is not limited to the embodiments described with reference to the figures, and variations may be conceived without exceeding the parameters of the present invention.

The invention claimed is:

1. A voltage inverter comprising:
    a load having n phases, each phase having a first terminal and a second terminal;
    a first cell and a second cell each comprising n branches, each branch comprising:
        two switches connected in series, each switch being able of being placed in a passing state or a blocking state,
        a mid-point located between the two switches,
    each first terminal of each of the load phases being connected to one of the mid-points of the first cell, each second terminal of each of the load phases being connected to one of the mid-points of the second cell,
    a voltage source,
    wherein the first cell is connected to the positive terminal of the voltage source via a first electrical isolator and to the negative terminal of the voltage source via a second electrical isolator, and wherein the second cell is connected to the positive terminal of the voltage source via a third electrical isolator and to the negative terminal via a fourth electrical isolator, each electrical isolator being able of being placed in a passing state or a blocking state, and
    wherein the voltage inverter further comprises a malfunction control and monitoring device configured to:
        control the switches and the electrical isolators,
        detect a malfunction in one of the switches, and
        detect a malfunction in the connection between one of the terminals of one of the phases and one of the mid-points.

2. The voltage inverter according to claim 1, wherein each switch consists of a static switch mechanism and a diode in antiparallel.

3. A method for controlling a voltage inverter according to claim 1, wherein, when no internal fault is detected in one of the switches of said voltage inverter the method comprises:
    placing the four electrical isolators into a passing state,
    controlling the switches such that each phase creates an H bridge with two branches to which it is connected.

4. A method for controlling a voltage inverter that includes
a load having n phases, each phase having a first terminal and a second terminal;
a first cell and a second cell each comprising n branches, each branch comprising
    two switches connected in series, each switch being able of being placed in a passing state or a blocking state,
    a mid-point located between the two switches,
each first terminal of each of the load phases being connected to one of the mid-points of the first cell, each second terminal of each of the load phases being connected to one of the mid-points of the second cell,
a voltage source,
wherein the first cell is connected to the positive terminal of the voltage source via a first electrical isolator and to the negative terminal of the voltage source via a second electrical isolator, and wherein the second cell is connected to the positive terminal of the voltage source via a third electrical isolator and to the negative terminal via a fourth electrical isolator, each electrical isolator being able of being placed in a passing state or a blocking state,
wherein, when no internal fault is detected in said voltage inverter, the method comprises:
placing the electrical isolator connected to the first cell into a blocking state, controlling the switches of the first cell such that the first cell forms a neutral point to which the n phases of the load are connected,
placing the electrical isolators connected to the second cell into a passing state;
controlling the switches of the second cell such that the two switches in the same branch of the second cell are in opposite states, one being passing and the other being blocking.

5. A method for controlling a voltage inverter that includes
a load having n phases, each phase having a first terminal and a second terminal;
a first cell and a second cell each comprising n branches, each branch comprising
    two switches connected in series, each switch being able of being placed in a passing state or a blocking state,
    a mid-point located between the two switches,
each first terminal of each of the load phases being connected to one of the mid-points of the first cell, each second terminal of each of the load phases being connected to one of the mid-points of the second cell,
a voltage source,
wherein the first cell is connected to the positive terminal of the voltage source via a first electrical isolator and to the negative terminal of the voltage source via a second electrical isolator, and wherein the second cell is connected to the positive terminal of the voltage source via a third electrical isolator and to the negative terminal via a fourth electrical isolator, each electrical isolator being able of being placed in a passing state or a blocking state,
wherein, when a fault is detected in one of the switches, the method comprises:
placing the electrical, isolators that are connected to the first or the second cell to which the faulty switch belongs into a blocking state,
controlling other switches of the first or the second cell to which the faulty switch belongs such that the first or the second cell to which the faulty switch belongs forms a neutral point to which the n phases of the load are connected.

6. A method for controlling a voltage inverter that includes
a load having n phases, each phase having a first terminal and a second terminal;
a first cell and a second cell each comprising n branches, each branch comprising
    two switches connected in series, each switch being able of being placed in a passing state or a blocking state,
    a mid-point located between the two switches,
each first terminal of each of the load phases being connected to one of the mid-points of the first cell, each second terminal of each of the load phases being connected to one of the mid-points of the second cell,
a voltage source,
wherein the first cell is connected to the positive terminal of the voltage source via a first electrical isolator and to the negative terminal of the voltage source via a second electrical isolator, and wherein the second cell is connected to the positive terminal of the voltage source via a third electrical isolator and to the negative terminal via a fourth electrical isolator, each electrical isolator being able of being placed in a passing state or a blocking state, wherein, when a fault is detected in a link between one of the terminals of one of the phases and one of the midpoints, the method comprises placing the switches that are connected to the phase that belongs to the faulty link into a blocking state.

7. A voltage inverter comprising:
a load having n phases, each phase having a first terminal and a second terminal;
a first cell and a second cell each comprising n branches, each branch comprising:
   two switches connected in series, each switch being able of being placed in a passing state or a blocking state,
   a mid-point located between the two switches,
each first terminal of each of the load phases being connected to one of the mid-points of the first cell, each second terminal of each of the load phases being connected to one of the mid-points of the second cell,
a voltage source,
wherein the first cell is connected to the positive terminal of the voltage source via a first electrical isolator and to the negative terminal of the voltage source via a second electrical isolator, and wherein the second cell is connected to the positive terminal of the voltage source via a third electrical isolator and to the negative terminal via a fourth electrical isolator, each electrical isolator being able of being placed in a passing state or a blocking state, and
wherein each mid-point is connected to a neutral point via a switching element, the switching element being capable of being placed in a blocking state or a passing state.

8. The method for controlling a voltage inverter according to claim 7, wherein, when a short-circuit fault is detected in one of the switches, the switching element to which the switch in short circuit is connected is placed in the passing state.

9. The method for controlling a voltage inverter according to claim 7, wherein, when no short-circuit fault is detected in the switches, all of the switching elements are placed in the blocking state.

* * * * *